Figure 1:
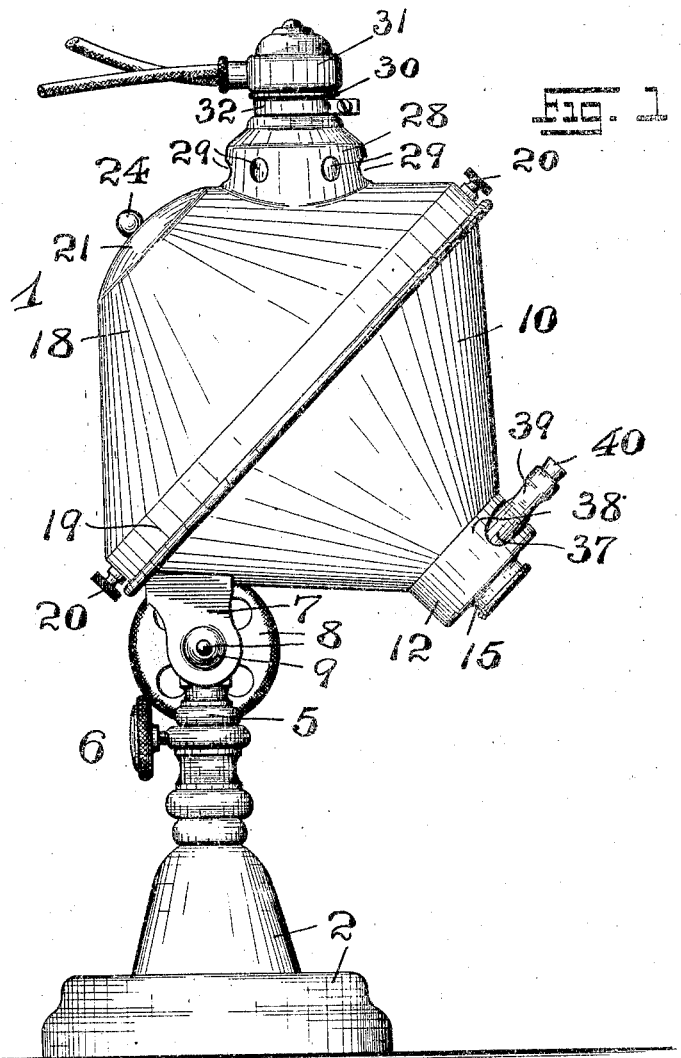

W. H. SPENCER.
ILLUMINATING DEVICE.
APPLICATION FILED JUNE 14, 1911.

1,034,041.

Patented July 30, 1912.
2 SHEETS—SHEET 1.

WITNESSES:
Fred'k H. W. Fraentzel
Harry E. Pfeiffer

INVENTOR:
William H. Spencer,
BY Fraentzel and Richards
ATTORNEYS

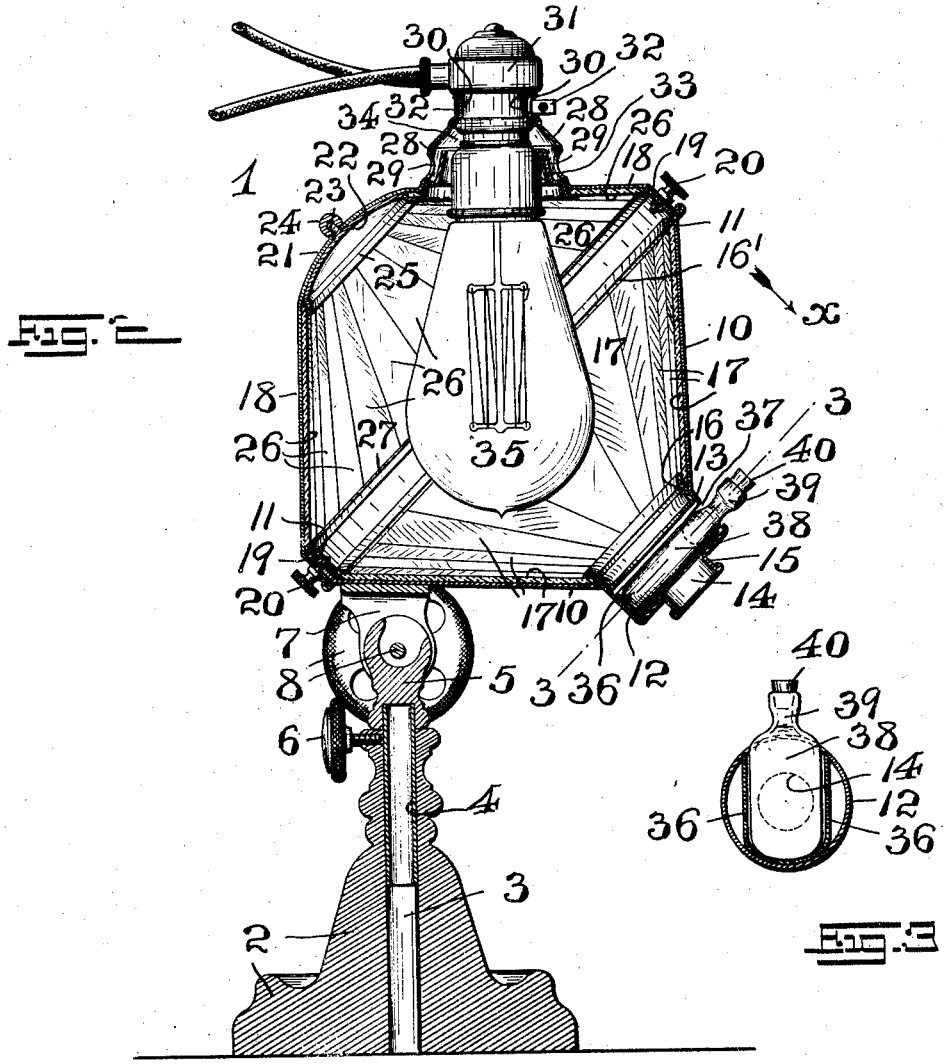

UNITED STATES PATENT OFFICE.

WILLIAM H. SPENCER, OF NEW YORK, N. Y., ASSIGNOR TO GEORGE FRINK SPENCER, OF NEWARK, NEW JERSEY.

ILLUMINATING DEVICE.

1,034,041.

Specification of Letters Patent. Patented July 30, 1912.

Application filed June 14, 1911. Serial No. 633,086.

*To all whom it may concern:*

Be it known that I, WILLIAM H. SPENCER, a citizen of the United States, residing at New York, in the county of New York and State of New York, have invented certain new and useful Improvements in Illuminating Devices; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in illuminating devices; and the invention relates, more particularly, to a novel construction of illuminating device adapted to be used to concentrate a bright light, of a desirable tone or color-value, upon the mirror of a microscope, which reflects said light through the apertures of the stage of said microscope upon the object to be examined, said object being supported by a slide, or other device upon said stage.

The present invention therefore has for its principal object to provide a novel and simple illuminating device for concentrating light upon the reflecting mirror of a microscope, or similar instrument.

A further object of the present invention is to provide a means, in connection with an illuminating device, for selecting and passing to the mirror of a microscope, or similar instrument, rays of light of a desired color value; or, in other words, to provide a means for selecting and passing certain light rays of the spectrum and eliminating or obstructing the passage of the objectionable or undesirable, or a preponderance of objectionable or undesirable rays of the spectrum. Such a means is of great value in the use of a microscope, when examining germs, bacteria or other indistinct formations. Such germs, bacteria, etc., are usually stained in various ways to preserve the same, and when the same are examined in a light having a preponderance of color rays similar to the color of the stain with which said germs, etc., are treated, it makes the same difficult of examination. For this reason, it is most satisfactory to illuminate the microscope with as nearly perfect a pure white light as can be obtained, since in such case, the stained germs, etc., no matter of what color are examined in a uniform light of such a neutral value that the same are clearly distinguishable.

Therefore among the important purposes of the present invention is that of providing such a pure white light. As will be well understood, most artificial light, no matter how generated, possesses a preponderance of red and yellow rays, which preponderance must be corrected and toned down to proper proportion to the other rays of light making up the spectrum before a pure white light is secured. The present invention provides in its light modifying screen a device perfectly adapted to secure such a result. While the example or illustration above-mentioned, points out one purpose and method of using the present invention, it is not intended to limit the said invention thereto, but the invention includes the use of means for eliminating wholly or in part any color ray or rays of the spectrum, whereby an illuminating light of any color or tone may be obtained for any special or desirable use, as will be understood from the subsequent description of the construction of the present invention.

With the various objects of this invention in view, the said invention consists, primarily, in the novel illuminating device hereinafter set forth; and, furthermore, this invention consists in the novel arrangements and combinations of the various mechanism and their parts, as well as in the details of the construction thereof, all of which will be more fully described in the following specification, and then finally embodied in the clauses of the claim which are appended to and which form an essential part of this specification.

The invention is clearly illustrated in the accompanying drawings, in which:—

Figure 1 is a side elevation of a novel construction of illuminating device made according to and embodying the principles of the present invention; Fig. 2 is a vertical longitudinal section of the same; and, Fig. 3 is a detail cross-section, taken on line 3—3 in said Fig. 2, looking in the direction of the arrow $x$.

Similar characters of reference are employed in all of the hereinabove described views, to indicate corresponding parts.

Referring now to the said drawings, the reference-character 1 indicates the complete illuminating unit made according to and embodying the principles of the present invention, the same comprising a base-member 2 provided with a receiving opening 3 adapted to receive the shank 4 of one member 5 of a knuckle-element. Said shank 4 is adapted to swivel or turn in said receiving opening 3, as well as to telescope therein, the same being locked in any desired adjusted position by means of a lock-screw 6. The reference-character 7 indicates the other member of said knuckle-element, the same being pivotally connected with its fellow-member 5 by means of a lock-screw 8, the screw-threaded end of which is received in an interiorly threaded boss 9 formed upon said member 7, thereby providing means for locking said threaded boss 9 formed upon said member 7, thereby providing means for locking said members 5 and 7 of the knuckle-element and the parts respectively connected therewith, in any desired adjusted relation to each other, said adjustment being a swinging adjustment in a vertical plane. Secured to and supported by means of said member 7 of the knuckle-element is the lower member 10 of a combined hood and reflector-shell, the same being preferably of a conical shape, and the same being further provided with an annular flange 11. The lower portion of said member 10 is provided with a reduced body-portion 12 providing a screen-receiving socket 13, said body-portion 12 being further provided in its bottom wall with an aperture or light-passage 14, which is surrounded by an outwardly projecting marginal flange 15. Secured in suitable locations to the inner surface of the said member 10 are the respective retainer-rings 16 and 16′ which are adapted to retain in place upon the inner surface of said member 10 a plurality of reflector-members 17, which are being preferably made of silvered glass, or any other suitable reflecting material. The reference-character 18 indicates the upper member of said combined hood and reflector-shell, the same being preferably of a conical shape, and being also provided with an annular flange 19 which is fitted over and registers with the said annular flange 11 of the lower-member 10. Lock screws 20 pass through the respective and registering annular flanges 11 and 19 so as to retain together in their assembled relation to each other the respective upper and lower members 18 and 10 of the said combined hood and reflector-shell. The said upper member 18 is provided at its upper end with a concave wall or closure 21, and arranged against the inner side of the said concave wall or closure is a concave concentrating reflector-member 22 which is provided with a screw-threaded shank 23, said shank passing through a perforation in said concave wall or closure, and being adapted to receive a lock-nut 24, by means of which the said concentrating reflector-member 22 is retained in its operative position within said upper member 18. Said concentrating reflector-member 22 is provided with a marginal flange or shoulder, as 25, which serves as retaining means for securing the upper ends of a series of reflector-members 26 which are disposed upon the inner surface of the said upper member 18, the lower end of said reflector-members 26 being retained by a retainer ring 27 which is also secured to said upper member 18. Connected with said upper member 18 of the combined hood and reflector-shell is a dome 28, the same being formed with a plurality of perforations or openings 29 providing ventilating means adapted to permit the escape of the heated air from within the interior of the combined hood and reflector-shell. Said dome 28 is provided with a split neck-piece 30, adapted to receive and retain in position, a lamp-socket 31, said neck-piece 30 being provided with a clamping strap 32 for binding the said neck-piece in its holding relation with said lamp-socket 31. Arranged within said dome 28 is a shade-flange 33, projecting upwardly within the said dome and registering in front of said holes or perforations 29, providing, however, an air-space 34 between the walls of said dome 28 and said shade-flange 33. Said shade-flange 33 prevents the passage of light-rays through said openings or perforations 29, while permitting the free circulation of the air therethrough. Secured to said lamp-socket 31, so as to be suspended within said combined hood and reflector-shell, is a lamp or lighting unit 35, the same being preferably of the electric incandescent type, although it will be understood that any style, type, or kind of illuminating unit may be substituted therefor, without departing from the scope of the present invention. Secured within the said screen-receiving socket 13, formed in connection with the lower member 10 of said combined hood and reflector-shell, is a screen-supporting frame 36, the same registering with an opening 37 in the wall of said body-portion 12 and through which may be introduced a light-controlling or modifying screen.

The said light-modifying screen may be made in various ways. A plain glass screen of the desired tint may be used, or a screen made of other materials may be employed which will modify the combinations of the various spectrum-rays which are directed therethrough. Therefore, I do not wish to limit my invention to the particular form of modifying screen shown in the drawings, although the same is the preferred style of modifying screen. The said light-modifying screen, as shown in the drawings, comprises a transparent receptacle 38 of glass, and preferably of a flat elongated shape, the same being provided with the usual neck 39 in which is secured a suitable stopper or cork 40. When in place within said screen-receiving socket 13 and supported by said supporting frame 36, the body of the said receptacle 38 registers with the aperture or light-passage 14 in the bottom wall of said body-portion 12. Said transparent glass receptacle 38 is adapted to be filled with a suitable fluid of a desired color which will act to obstruct the passage of the undesired rays of the spectrum, while permitting the passage of the desired rays therethrough. The convenience of using said receptacle and the fluid contained therein, lies in the fact that a nicer and more accurate gradation of the color-tone of the screen may be secured, since the coloring matter contained in the fluid may be easily increased or decreased until the desired color-tone is obtained; and, furthermore, a more uniform and even distribution of the coloring matter may be obtained by the use of the fluid-carrying medium.

It will be clearly understood, that the combined hood and reflector shell is light-proof, and the arrangement of reflector-members therein causes a brilliant light to pass through said modifying-screen and the light aperture or passage 14, and concentrates a desired color of light-rays upon the mirror of the microscope which reflects the same upwardly through the aperture of the microscope-stage and upon the objects to be examined. It will also be apparent from an inspection of the drawings, that the said combined hood and reflector-shell is capable of any desired adjustment, owing to its swiveled and articulated connection with its base, thus rendering it easily and quickly adjustable, so as to cast its light upon the mirror of said microscope.

I am aware that changes may be made in the general arrangements and combinations of the various devices and parts, as well as in the details of the construction of the same, without departing from the scope of the present invention, as set forth in the foregoing specification, and as defined in the claims which are appended thereto. Hence, I do not limit my invention to the exact arrangement and combinations of the said devices and parts as described in said specification, nor do I confine myself to the exact details of the construction of the said parts as illustrated in the accompanying drawings.

I claim:—

1. An illuminating device comprising a combined hood and reflector-shell provided in its lower portion with a light outlet, a concentrating reflector arranged in the upper portion of said combined hood and reflector-shell, redirecting and intensifying reflector-members supported upon the inner sides of said combined hood and reflector-shell, an illuminating unit supported within said combined hood and reflector-shell, and a light-modifying screen supported in registration with said light outlet.

2. An illuminating device comprising a combined hood and reflector-shell provided in its lower portion with a light outlet, a concentrating reflector arranged in the upper portion of said combined hood and reflector-shell, redirecting and intensifying reflector-members supported upon the inner sides of said combined hood and reflector shell, an illuminating unit supported within said combined hood and reflector-shell, and a light-modifying screen supported in registration with said light outlet, comprising a transparent receptacle containing a fluid treated with coloring matter.

In testimony that I claim the invention set forth above I have hereunto set my hand this seventh day of June, 1911.

WILLIAM H. SPENCER.

Witnesses:
ALBERT PIO DE BENITO,
CHAS. K. WYATT.